(12) United States Patent
Shimizu et al.

(10) Patent No.: US 9,493,623 B2
(45) Date of Patent: Nov. 15, 2016

(54) CROSSLINKABLE AND FOAMABLE COMPOSITION, CROSSLINKED FOAM, AND SHOE MIDSOLE COMPRISING THE SAME

(75) Inventors: Daisuke Shimizu, Tokyo (JP); Yoshifumi Araki, Tokyo (JP); Katsumi Suzuki, Tokyo (JP); Yasuhiro Kusanose, Tokyo (JP); Mika Horiuchi, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 214 days.

(21) Appl. No.: 13/133,238

(22) PCT Filed: Dec. 21, 2009

(86) PCT No.: PCT/JP2009/007069
§ 371 (c)(1),
(2), (4) Date: Jul. 15, 2011

(87) PCT Pub. No.: WO2010/073589
PCT Pub. Date: Jul. 1, 2010

(65) Prior Publication Data
US 2011/0275731 A1 Nov. 10, 2011

(30) Foreign Application Priority Data
Dec. 22, 2008 (JP) ................................ 2008-325652
Dec. 22, 2008 (JP) ................................ 2008-325655

(51) Int. Cl.
| | |
|---|---|
| C08J 9/04 | (2006.01) |
| C08L 53/02 | (2006.01) |
| C08J 9/10 | (2006.01) |
| A43B 13/04 | (2006.01) |
| A43B 13/12 | (2006.01) |
| C08J 9/00 | (2006.01) |
| C08L 23/08 | (2006.01) |
| C08K 5/14 | (2006.01) |

(52) U.S. Cl.
CPC ............... *C08J 9/10* (2013.01); *A43B 13/04* (2013.01); *A43B 13/125* (2013.01); *C08J 9/0061* (2013.01); *C08L 23/0815* (2013.01); *C08L 53/025* (2013.01); *C08J 2201/026* (2013.01); *C08J 2323/06* (2013.01); *C08J 2453/00* (2013.01); *C08K 5/14* (2013.01); *C08L 2203/14* (2013.01)

(58) Field of Classification Search
CPC .... C08J 9/0061; C08J 9/10; C08J 2201/026; C08J 2323/08; C08J 2453/00; C08L 23/0815; C08L 53/025; C08L 2203/14; C08K 5/14
USPC ................ 521/34, 139, 140, 142, 146, 148; 525/98, 192, 19
See application file for complete search history.

(56) References Cited

U.S. PATENT DOCUMENTS

| | | | | |
|---|---|---|---|---|
| 3,673,281 | A | * | 6/1972 | Bronstert et al. ............. 525/339 |
| 3,935,176 | A | * | 1/1976 | Hawkins et al. .......... 525/332.9 |
| 4,501,857 | A | | 2/1985 | Kishimoto et al. |
| 4,673,714 | A | | 6/1987 | Kishimoto et al. |
| 5,814,710 | A | * | 9/1998 | Rekonen et al. ............. 525/338 |
| 7,186,783 | B2 | * | 3/2007 | De Jong ....................... 525/339 |
| 2002/0143077 | A1 | | 10/2002 | Sueda et al. |
| 2003/0013778 | A1 | | 1/2003 | Sueda et al. |
| 2006/0154998 | A1 | * | 7/2006 | Shiba et al. .................. 521/142 |
| 2007/0129454 | A1 | | 6/2007 | Su et al. |
| 2009/0312449 | A1 | | 12/2009 | Sasaki et al. |

FOREIGN PATENT DOCUMENTS

| | | |
|---|---|---|
| JP | 43-6636 | 4/1963 |
| JP | 42-8704 | 12/1963 |
| JP | 62-79211 | 4/1987 |
| JP | 1-37970 | 8/1989 |
| JP | 1-53851 | 11/1989 |
| JP | 2-9041 | 2/1990 |
| JP | 5-345833 | 12/1993 |
| JP | 8-109219 | 4/1996 |
| JP | H09-124824 A | 5/1997 |
| JP | 63-4841 | 1/1998 |
| JP | 2000-344924 | 12/2000 |

(Continued)

OTHER PUBLICATIONS

International Preliminary Report on Patentability for PCT/JP2009/007069, mailed Jul. 5, 2011.
Chinese Office Action issued with respect to corresponding Chinese Application No. 200980151402.9 dated Jul. 23, 2012.
Database WPI Week 200456 Thomson Scientific, London, GB; AN 2004-575409 XP002712517, & JP2004-217681A (Tosoh Corp) Aug. 5, 2004 Abstract.
European Search Report issued with respect to European Application No. 09834400.5, mail date is Sep. 17, 2013.
Office Action issued with respect to Korean Application No. 10-2011-7014364, mail date is Sep. 5, 2013.

(Continued)

*Primary Examiner* — Irina S Zemel
(74) *Attorney, Agent, or Firm* — Greenblum & Bernstein, P.L.C.

(57) ABSTRACT

The present invention provides a crosslinked foam having an excellent balance of various physical properties in terms of lightness, flexibility, permanent compression set, tear strength, impact resilience, and molding stability; a shoe midsole; and a crosslinkable and foamable composition that provides the crosslinked foam and shoe midsole. A crosslinkable and foamable composition comprising (A) an ethylene-based copolymer; (B) a copolymer comprising a vinyl aromatic monomer unit and an unsaturated bond-containing a conjugated diene monomer unit; (C) an organic peroxide; and (D) a foaming agent; a mass ratio of the component (A) to the component (B), (A/B), being from 97/3 to 50/50; and the component (B) comprising 5 mass % or more and 80 mass % or less of the vinyl aromatic monomer unit, and 5 mass % or more and 55 mass % or less of the conjugated diene monomer unit.

15 Claims, No Drawings

(56) References Cited

FOREIGN PATENT DOCUMENTS

| | | | |
|---|---|---|---|
| JP | 2002-302565 | | 10/2002 |
| JP | 2004-107519 | | 4/2004 |
| JP | 2004-217681 | * | 8/2004 |
| JP | 2008-024950 A | | 2/2008 |
| JP | 4313637 | | 5/2009 |
| KR | 10-2006-0016112 | | 2/2006 |
| WO | 2007/094216 A1 | | 8/2007 |

OTHER PUBLICATIONS

International Search Report for PCT/JP2009/007069, mailed Feb. 2, 2010.
European Search Report issued with respect to application No. 161543483, mail date is Apr. 16, 2016.
Japanese Office Action issued with respect to Japanese Application No. 2010-543838, mail date is May 16, 2014.

\* cited by examiner

CROSSLINKABLE AND FOAMABLE COMPOSITION, CROSSLINKED FOAM, AND SHOE MIDSOLE COMPRISING THE SAME

TECHNICAL FIELD

The present invention relates to a crosslinkable and foamable composition, a crosslinked foam, and a shoe midsole comprising the same.

BACKGROUND ART

In recent years, foam materials have been attracting attention in view of achieving lightweight. However, if a composition containing a resin or elastomer is merely foamed, the mechanical strength will decrease, causing problems such as deterioration and deformation after long-term use. For this reason, such a composition is made into a crosslinked foam, thereby finding a wide range of applications as a material that is lightweight and has a high mechanical strength, such as automobile-related parts, construction-related parts, various packaging materials, and daily necessities.

Ethylene-vinyl acetate copolymers (EVA) are known as representative crosslinked foams; however, because EVA has a low melt tension, defoaming easily occurs, preventing the expansion ratio from increasing, resulting in an increased specific gravity. Furthermore, another problem thereof is that the defoaming causes significantly rough skin.

Thus, proposals have been made regarding crosslinked foams using ethylene-α-olefin-based copolymers. Patent Document 1 discloses a crosslinked foam obtained by crosslinking and foaming an ethylene-α-olefin-based copolymer, using an organic peroxide, a crosslinking coagent, and a foaming agent. Patent Document 2 discloses a crosslinked foam obtained by crosslinking and foaming a composition obtained by adding EVA and/or low density polyethylene to an ethylene-α-olefin-based copolymer. Furthermore, studies have been conducted on modifying the properties and improving the physical properties of a crosslinked foam by adding a styrene-based block copolymer to an ethylene-based copolymer. Patent Document 3 discloses a crosslinked foam obtained by adding a specific proportion of a styrene-based block copolymer to an ethylene-based copolymer.

Patent Document 1: Japanese Patent Laid-Open No. 2000-344924
Patent Document 2: Japanese Patent Laid-Open No. 2002-302565
Patent Document 3: Japanese Patent Laid-Open No. 2004-107519

SUMMARY OF THE INVENTION

Problems to be Solved by the Invention

However, even if a styrene-based block copolymer is added to an ethylene-based copolymer, it is difficult to produce a crosslinked foam having a good balance of various physical properties. For example, in the case of the crosslinked foam disclosed in Patent Document 3, because the ethylene-α-olefin-based copolymer has a low hardness, when crosslinking is performed at a high expansion ratio, problems such as defoaming and deformation of the crosslinked foam occur. It is thus difficult to give a lightweight crosslinked foam; or, even if a lightweight crosslinked foam is obtained, the mechanical properties and the like of the foam often significantly deteriorate. Accordingly, no methods have heretofore been known to produce a crosslinked foam that is lightweight and has high mechanical properties at the same time.

The present invention has been made in view of the above-described circumstances. One object of the present invention is to provide a crosslinked foam having an excellent balance of various physical properties in terms of lightness, flexibility, permanent compression set, tear strength, impact resilience, and molding stability; a shoe midsole; and a crosslinkable and foamable composition that provides the crosslinked foam and shoe midsole.

Means for Solving the Problems

The present inventors conducted extensive research to solve the above-mentioned problem; consequently, they found that the problem can be solved by adding a specific proportion of a vinyl aromatic-based copolymer having a specific structure to an ethylene-based copolymer, and thereby accomplished the present invention.

In summary, the present invention is as described below.

[1]
A crosslinkable and foamable composition comprising:
(A) an ethylene-based copolymer;
(B) a vinyl aromatic-based copolymer comprising a vinyl aromatic monomer unit and an unsaturated bond-containing a conjugated diene monomer unit;
(C) an organic peroxide; and
(D) a foaming agent;
 a mass ratio of the component (A) to the component (B), (A/B), being from 97/3 to 50/50; and
 the component (B) comprising 5 mass % or more and 80 mass % or less of the vinyl aromatic monomer unit, and 5 mass % or more and 55 mass % or less of the conjugated diene monomer unit.

[2]
A crosslinkable and foamable composition comprising:
(A) an ethylene-based copolymer;
(B) a vinyl aromatic-based copolymer comprising a vinyl aromatic monomer unit and an unsaturated bond-containing a conjugated diene monomer unit;
(C) an organic peroxide; and
(D) a foaming agent;
 a mass ratio of the component (A) to the component (B), (A/B), being from 97/3 to 50/50; and
 the component (B) comprising 5 mass % or more and less than 45 mass % of the vinyl aromatic monomer unit, and 5 mass % or more and 50 mass % or less of the conjugated diene monomer unit.

[3]
A crosslinkable and foamable composition comprising:
(A) an ethylene-based copolymer;
(B) a vinyl aromatic-based copolymer comprising a vinyl aromatic monomer unit and an unsaturated bond-containing a conjugated diene monomer unit, and having at least a polymer block mainly containing a vinyl aromatic monomer unit;
(C) an organic peroxide; and
(D) a foaming agent;
 a mass ratio of the component (A) to the component (B), (A/B), being from 97/3 to 50/50; and
 the component (B) comprising 45 mass % or more and 80 mass % or less of the vinyl aromatic monomer unit, 45 mass % or more of the component (B) being included in the polymer block mainly containing the vinyl aromatic monomer unit, and the component (B) comprising 5 mass % or more and 55 mass % or less of the conjugated diene monomer unit.

[4]

The crosslinkable and foamable composition according to any one of [1] to [3], wherein the component (A) is an ethylene-α-olefin-based copolymer.

[5]

The crosslinkable and foamable composition according to any one of [1] to [4], wherein the component (B) is a styrene-based block copolymer.

[6]

The crosslinkable and foamable composition according to any one of [1] to [5], wherein the mass ratio of the component (A) to the component (B), (A/B), is from 95/5 to 70/30.

[7]

The crosslinkable and foamable composition according to any one of [1] to [6], wherein the component (B) comprises 10 to 30 mass % of the conjugated diene monomer unit.

[8]

The crosslinkable and foamable composition according to any one of [1] to [7], further comprising:

(E) a crosslinking coagent.

[9]

The crosslinkable and foamable composition according to any one of [1] to [8], wherein the component (B) is a hydrogenated vinyl aromatic-based block copolymer in which a double bond in the component (B) is at least partially hydrogenated.

[10]

The crosslinkable and foamable composition according to any one of [1] to [9], wherein the component (B) is a hydrogenated styrene-based block copolymer.

[11]

The crosslinkable and foamable composition according to any one of [1] to [10], wherein the component (B) is obtainable by hydrogenating a block copolymer comprising a polymer block mainly containing styrene and a polymer block mainly containing 1,3-butadiene.

[12]

The crosslinkable and foamable composition according to [11], wherein a 1,2-vinyl bond content in the conjugated diene monomer unit of the polymer block mainly containing 1,3-butadiene prior to hydrogenation is from 5 to 50%.

[13]

The crosslinkable and foamable composition according to [12], wherein the component (B) has a tan δ peak temperature within a range of −80° C. or more and −30° C. or less, as determined by dynamic viscoelasticity measurement (1 Hz).

[14]

The crosslinkable and foamable composition according to any one of [1] to [13], wherein the component (B) has a functional group.

[15]

A crosslinked foam obtainable by crosslinking and foaming the crosslinkable and foamable composition according to any one of [1] to [14].

[16]

A crosslinked foam obtainable by crosslinking and foaming the crosslinkable and foamable composition according to any one of [2] and [4] to [15];

wherein the crosslinked foam has a specific gravity within a range of 0.1 or more and 0.50 or less, an impact resilience within a range of 30% or more and 80% or less, and a hardness (Shore C) within a range of 30 or more and 70 or less.

[17]

A crosslinked foam obtainable by crosslinking and foaming the crosslinkable and foamable composition according to any one of [3] to [15];

wherein the crosslinked foam has a specific gravity within a range of 0.05 or more and 0.15 or less, and a hardness (Shore C) within a range of 30 or more and 70 or less.

[18]

The crosslinked foam according to [17], wherein the crosslinked foam has an impact resilience of 30% or more and 80% or less.

[19]

A shoe midsole comprising the crosslinked foam according to any one of [15] to [18].

Advantageous Effects of the Invention

The crosslinkable and foamable composition of the present invention can provide a crosslinked foam and a shoe midsole having an excellent balance of various physical properties in terms of lightness, flexibility, permanent compression set, tear strength, impact resilience, and molding stability.

MODES FOR CARRYING OUT THE INVENTION

An embodiment for carrying out the present invention (hereinafter, referred to simply as "present embodiment") will now be described in detail below. The following embodiment is illustrated for the purpose of describing the present invention, and is not intended to limit the present invention to the following contents. The present invention may be carried out with various appropriate modifications made within the scope of the invention.

The phrase "mainly contain" used in the present embodiment means that 60 mass % or more of the monomer unit is contained in a block. For example, in the case of "a polymer block mainly containing A", 60 mass % or more of A (monomer) unit is contained in the block.

A crosslinkable and foamable composition of the present embodiment is a composition prior to crosslinking and foaming, which comprises:

(A) an ethylene-based copolymer;
(B) a copolymer comprising a vinyl aromatic monomer unit and an unsaturated bond-containing a conjugated diene monomer unit;
(C) an organic peroxide; and
(D) a foaming agent;

a mass ratio of the component (A) to the component (B), (A/B), is from 97/3 to 50/50; and the component (B) comprises 5 mass % or more and 80 mass % or less of the vinyl aromatic monomer unit, and 5 mass % or more and 55 mass % or less of the conjugated diene monomer unit.

This results in a crosslinked foam having an excellent balance of physical properties, at least in terms of lightness, flexibility, permanent compression set, tear strength, impact resilience, and molding stability.

Further, one aspect of the crosslinkable and foamable composition of the present embodiment is a composition prior to crosslinking and foaming, which comprises:

(A) an ethylene-based copolymer;
(B) a copolymer comprising a vinyl aromatic monomer unit and an unsaturated bond-containing a conjugated diene monomer unit;

(C) an organic peroxide; and
(D) a foaming agent;
  a mass ratio of the component (A) to the component (B), (A/B), is from 97/3 to 50/50; and
  the component (B) comprising 5 mass % or more and less than 45 mass % of the vinyl aromatic monomer unit, and 5 mass % or more and 50 mass % or less of the conjugated diene monomer unit.

In the present embodiment, when the amount of the vinyl aromatic monomer unit contained in the component (B) is 5 mass % or more and less than 45 mass %, the resulting crosslinked foam can not only be particularly excellent in terms of impact resilience, tensile strength, and permanent compression set, but can also be lightweight, flexible, and have excellent molding stability.

Further, another aspect of the crosslinkable and foamable composition of the present embodiment is a composition prior to crosslinking and foaming, which comprises:
(A) an ethylene-based copolymer;
(B) a copolymer comprising a vinyl aromatic monomer unit and an unsaturated bond-containing a conjugated diene monomer unit, and having at least a polymer block mainly containing a vinyl aromatic monomer unit;
(C) an organic peroxide; and
(D) a foaming agent;
  a mass ratio of the component (A) to the component (B), (A/B), is from 97/3 to 50/50; and
  the component (B) comprising 45 mass % or more and 80 mass % or less of the vinyl aromatic monomer unit, 45 mass % or more of the component (B) is included in the polymer block mainly containing the vinyl aromatic monomer unit, and the component (B) comprises 5 mass % or more and 55 mass % or less of the conjugated diene monomer unit.

In the present embodiment, when the amount of the vinyl aromatic monomer unit contained in the component (B) is 45 mass % or more and 80 mass % or less, and 45 mass % or more of the component (B) is included in the polymer block mainly containing the vinyl aromatic monomer unit, the resulting crosslinked foam and shoe midsole can be particularly lightweight and flexible, while having excellent permanent compression set, tear strength, impact resilience, and molding stability.

<(A) Ethylene-Based Copolymer>

The (A) ethylene-based copolymer is a copolymer containing ethylene as a structural unit. The ethylene-based copolymer is not particularly limited, and a known ethylene-based copolymer can be used. Examples of ethylene-based copolymers may include polyethylene (PE), which is an ethylene polymer, ethylene-vinyl acetate copolymers (EVA) obtainable by copolymerization of ethylene and vinyl acetate, ethylene-α-olefin-based copolymers, which are low-crystallinity random copolymers of ethylene and C3-C10 α-olefins, and block copolymers containing ethylene and α-olefins (for example, multi-block copolymers composed of random blocks containing hard segments of crystalline polyethylene and soft segments of ethylene-octene).

When polyethylene is used in the present embodiment, the type of the polyethylene is not limited, and any known polyethylene can be used. Examples thereof may include high density polyethylene, ultra-high molecular weight high density polyethylene, low density polyethylene, linear low density polyethylene, and ultra-low density polyethylene. Similarly, when a mixture of a polyethylene-based resin and polypropylene-based resin is used, a crosslinked foam having various good physical properties can be obtained. In this case, examples of methods for crosslinking and foaming may include, but are not particularly limited to, a method as described in Japanese Patent Publication No. 4313637, which includes mixing a composition in an extruder to prepare a resin sheet, and subsequently crosslinking the composition by electron beam radiation, followed by foaming by further heating.

In the present embodiment, a copolymer containing three or more compounds, i.e., ethylene, and two or more compounds other than ethylene, may be used. Examples thereof may include copolymers containing ethylene and two α-olefins (terpolymers), and copolymers obtainable by crosslinking copolymers containing ethylene, α-olefins, and unsaturated carboxylic acids (acrylic acid, methacrylic acid, maleic acid, and the like) with metal ions such as $Na^+$, $K^+$, $Ag^+$, $Cu^{2+}$, $Ba^{2+}$, $Zn^{2+}$, and $Fe^{2+}$ (ionomers).

In the present embodiment, these ethylene-based copolymers may be used singly or in combinations of two or more. Among the above, from the viewpoint of reactivity with an organic peroxide and fabricability, ethylene-α-olefin-based copolymers containing ethylene and α-olefins are preferred; ethylene-α-olefin-based copolymers containing ethylene and C3-C10 α-olefins are more preferred; ethylene-α-olefin-based copolymers containing ethylene and C3-C6 α-olefins are still more preferred; and ethylene-α-olefin-based copolymers containing ethylene and C3 or C4 propylene or 1-butene are even more preferred.

Ethylene-α-olefin-based copolymers can be obtainable by known polymerization processes. Examples of polymerization processes may include polymerization in inert solvents such as hexane, heptane, toluene, and xylene, using polymerization catalysts such as Ziegler-Natta catalysts and metallocene catalysts.

<(B) Vinyl Aromatic-Based Copolymer>

The (B) vinyl aromatic-based copolymer is a block copolymer containing a vinyl aromatic monomer unit (I) and a conjugated diene monomer unit (II). The (B) vinyl aromatic-based copolymer contains 5 mass % or more and 80 mass % or less of the vinyl aromatic monomer unit (I), and contains 5 to 55 mass % of the conjugated diene monomer unit (II). In the present embodiment, the component (B) may also contain another polymerizable monomer as a structural unit other than the vinyl aromatic monomer unit (I) and conjugated diene monomer unit (II), within a range that does not impair the purpose of the present embodiment.

For example, when a block copolymer containing 20 mass % of the vinyl aromatic monomer unit (I) and 80 mass % of the conjugated diene monomer unit (II) is selectively hydrogenated such that 60% of the unsaturated bond in the conjugated diene monomer unit is hydrogenated, the resulting block copolymer will have 20 mass % of the vinyl aromatic monomer unit (I) and 32 mass % of the conjugated diene monomer unit (II) (the 32 mass % portion, which accounts for 40% of the 80 mass % of the conjugated diene monomer unit (II), will remain unhydrogenated).

The vinyl aromatic monomer unit (I) contained in the component (B) is not particularly limited, and known vinyl aromatic monomer units can be used. Examples of the component (B) may include styrene, o-methylstyrene, p-methylstyrene, p-tert-butylstyrene, 1,3-dimethylstyrene, α-methylstyrene, vinylnaphthalene, and vinylanthracene. These components may be used singly or in combinations of two or more. Among the above, styrene is preferred.

The amount of the vinyl aromatic monomer unit (I) contained in the component (B) may be from 5 to 80 mass %; within this range, an appropriate hardness or the like can be imparted to the crosslinked foam. This stabilizes the shape of the foam, enabling crosslinking and foaming at a high expansion ratio. This results in a crosslinked foam having an excellent balance of at least lightness, flexibility, permanent compression set, tear strength, impact resilience, and molding stability. By increasing or reducing the amount of the vinyl aromatic monomer unit (I) contained in the component (B) within the range of from 5 to 80 mass %, it is possible to further improve particular physical properties among the above-mentioned various physical properties of the crosslinked foam, while maintaining a good balance of the various physical properties.

For example, the amount of the vinyl aromatic monomer unit (I) contained in the component (B) is preferably 5 mass % or more and less than 45 mass %, because the resulting crosslinked foam will not only be particularly excellent in terms of impact resilience, tear strength, and permanent compression set, but will also be lightweight, flexible, and have excellent molding stability. More preferably, the amount of the vinyl aromatic monomer unit (I) contained in the component (B) is from 15 to 30 mass %. Within this range, the resulting crosslinked foam can be particularly excellent in terms of impact resilience, tear strength, and permanent compression set among the various physical properties.

The amount of the vinyl aromatic monomer unit (I) contained in the component (B) is 45 mass % or more and 80 mass % or less; and 45 mass % or more of the component (B) is included in at least one vinyl aromatic block segment (a polymer block segment mainly containing the vinyl aromatic monomer unit (I)). Such a component is preferred because the resulting crosslinked foam can be particularly lightweight and flexible, while having excellent permanent compression set, tear strength, impact resilience, and molding stability. The amount of the vinyl aromatic monomer unit (I) contained in the component (B) is more preferably from 55 to 70 mass %. Within this range, the crosslinkable and foamable composition can be highly foamed during crosslinking and foaming, resulting in a crosslinked foam that is particularly excellent in terms of lightness and flexibility among the various physical properties.

The conjugated diene monomer unit (II) contained in the component (B) is formed of a diolefin having the conjugated double bond. The diolefin usable in the present embodiment is not particularly limited, and a known diolefin can be used. Examples thereof may include 1,3-butadiene, isoprene, 2,3-dimethyl-butadiene, 2-methyl-1,3-pentadiene, myrcene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene, and mixtures thereof. These diolefins can be used singly or in combinations of two or more. Among the above, 1,3-butadiene is preferred.

In the present embodiment, the amount of the conjugated diene monomer unit (II) contained in the component (B) may be at least from 5 to 55 mass %. More particularly, when the amount of the vinyl aromatic monomer unit (I) in the component (B) is 5 mass % or more and less than 45 mass %, the amount of the conjugated diene monomer unit (II) is preferably 5 mass % or more and 50 mass % or less; and when the amount of the vinyl aromatic monomer unit (I) in the component (B) is 45 mass % or more and 80 mass % or less, the amount of the conjugated diene monomer unit (II) is preferably 5 mass % or more and 55 mass % or less. In both of these cases, the amount of the conjugated diene monomer unit (II) contained in the component (B) is more preferably 7 mass % or more and 40 mass % or less, and still more preferably 10 mass % or more and 30 mass % or less.

In the present embodiment, the use of the component (B) containing the above-defined proportion of the conjugated diene monomer unit (II) allows the rates of crosslinking reactions of the components (A) and (B) to be substantially equal. This reduces nonuniform crosslinking, produces fine and uniform cells, and further achieves crosslinking and foaming with a high degree of closed cells, thus resulting in a crosslinked foam having an excellent permanent compression set, impact resilience, and tear strength, as well as having an excellent appearance.

Examples of the structure of the component (B) may include, but are not particularly limited to, the following: (1) a block copolymer of a conjugated diene compound and a vinyl aromatic compound, and its hydrogenated product; (2) a copolymer of a conjugated diene compound, a vinyl aromatic compound, and another polymerizable monomer, and its hydrogenated product; and (3) rubber-modified styrene-based resin (HIPS).

Examples of the other polymerizable monomer for the copolymer (2) may include olefins such as ethylene, propylene, and butylene; vinyl halides such as vinyl chloride and vinylidene chloride; vinyl acetate; acrylic acid esters such as acrylic acid and methyl acrylate; methacrylic acid esters such as methacrylic acid and methyl methacrylate; acrylonitrile, and methacrylonitrile. Among these, preferred is a hydrogenated vinyl aromatic-based block copolymer in which the double bond in the component (B) is at least partially hydrogenated, from the viewpoint of its crosslinking reactivity.

The number average molecular weight of the component (B) is not particularly limited, but is typically 1,000 or more, preferably from 5,000 to 5,000,000, and more preferably from 10,000 to 500,000, from the viewpoint of the fabricability and physical property balance.

A styrene-based block copolymer containing styrene as a vinyl aromatic monomer and its hydrogenated product are preferred as the component (B). Specifically, a block copolymer composed of a polymer block mainly containing styrene and a polymer block mainly containing 1,3-butadiene, and its hydrogenated product, are more preferred. More specific examples thereof may include a block copolymer having the styrene-butadiene-styrene structure and its hydrogenated product. In this case, the microstructure of the portions of the conjugated diene monomer unit (II) (the cis, trans, and vinyl proportions) in the block copolymer prior to hydrogenation is not particularly limited; however, the 1,2-vinyl bond content in the 1,3-butadiene used as the conjugated diene monomer unit is preferably from 5 to 90%, more preferably from 5 to 80%, and still more preferably from 5 to 50%. Further, it is preferred that 70% or more of the 1,2-vinyl bond content in the conjugated diene monomer unit (II) be hydrogenated by hydrogenation. In the crosslinkable and foamable composition that uses such a block copolymer, the crosslinking reaction at the 1,2-vinyl bond site can be inhibited during crosslinking and foaming. Consequently, the impact resilience, tear strength, and permanent compression set of the resulting crosslinked foam can be further improved.

The method for producing the component (B) is not particularly limited, and any known method can be used. Examples of methods may include a method in which living anionic polymerization is performed in a hydrocarbon solvent, using an initiator such as an organoalkali metal compound.

The hydrocarbon solvent is not particularly limited, and a known solvent can be used. Examples of hydrocarbon solvents may include aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene. These hydrocarbon solvents can be used singly or in combinations of two or more.

The initiator is not particularly limited; and initiators that are known to have anionic polymerization activity with conjugated diene compounds and vinyl aromatic compounds can generally be used, such as aliphatic hydrocarbon alkali metal compounds, aromatic hydrocarbon alkali metal compounds, and organic amino alkali metal compounds. Examples of alkali metals may include lithium, sodium, and potassium. Preferable examples of organic alkali metal compounds may include C1-C20 aliphatic and aromatic hydrocarbon lithium compounds; specific examples of these lithium compounds may include compounds containing one lithium atom per molecule, and dilithium, trilithium, and tetralithium compounds containing two or more lithium atoms per molecule. More specific examples thereof may include n-propyl lithium, n-butyl lithium, sec-butyl lithium, tert-butyl lithium, n-pentyl lithium, n-hexyl lithium, benzyl lithium, phenyl lithium, tolyl lithium, the reaction product of diisopropenylbenzene and sec-butyllithium, and the reaction product of divinylbenzene, sec-butyllithium, and 1,3-butadiene.

The vinyl aromatic-based copolymer can be hydrogenated according to a heretofore known method. The hydrogenation catalyst is not particularly limited, and any heretofore known hydrogenation catalyst can be used. Specific examples thereof may include:
(1) a support type heterogeneous hydrogenation catalyst having a metal such as Ni, Pt, Pd, Ru or the like supported on carbon, silica, alumina, diatomaceous earth or the like;
(2) a so-called Ziegler type hydrogenation catalyst using an organic acid salt of Ni, Co, Fe, Cr or the like or a transition metal salt such as acetylacetone salt and a reducing agent such as organoaluminum; and
(3) a homogeneous hydrogenation catalyst such as so-called organometallic complex, e.g., an organometallic compound of Ti, Ru, Rh, Zr or the like. Other hydrogenation catalysts are also usable, for example, those described in Japanese Patent Publication No. 42-8704, Japanese Patent Publication Nos. 43-6636, 63-4841, 1-37970, 1-53851, and 2-9041. Among the above, examples of preferred hydrogenation catalysts may include a titanocene compound and/or a reducing organometallic compound.

The compounds described in, for example, Japanese Patent Laid-Open No. 8-109219 are usable as the titanocene compound; specific examples thereof may include compounds containing at least one ligand having a (substituted) cyclopentadienyl skeleton such as biscyclopentadienyl titanium dichloride and monopentamethylcyclopentadienyl titanium trichloride, an indenyl skeleton or a fluorenyl skeleton.

Examples of reducing organometallic compounds may include organoalkali metal compounds such as organolithium, organomagnesium compounds, organoaluminum compounds, organoboron compounds, and organozinc compounds.

The hydrogenation reaction conditions are not particularly limited, but the hydrogenation is typically performed at a temperature of from 0 to 200° C., and more preferably from 30 to 150° C. The hydrogen pressure in the hydrogenation reaction is not particularly limited, but is typically from 0.1 to 15 MPa, preferably from 0.2 to 10 MPa, and more preferably from 0.3 to 5 MPa. The hydrogenation reaction time is typically from 3 minutes to 10 hours, and preferably from 10 minutes to 5 hours. The hydrogenation reaction can be performed using a batch process, a continuous process, or a combination thereof.

The catalyst residue may be removed, as required, from the thus-obtained hydrogenated block copolymer solution, and the hydrogenated block copolymer can be separated from the solvent. Examples of methods for separating the solvent may include, but are not limited to, a method in which a polar solvent such as acetone or an alcohol, which is a poor solvent for the hydrogenated copolymer, is added to the hydrogenated reaction mixture to precipitate the polymer, thereby collecting the polymer; a method in which the reaction mixture is poured into hot water while stirring, and the solvent is removed by steam stripping, thereby collecting the polymer; and a method in which the polymer solution is directly heated to distill off the solvent. The hydrogenated block copolymer of the present embodiment may contain stabilizers such as various phenol-based stabilizers, phosphorus-based stabilizers, sulfur-based stabilizers, and amine-based stabilizers.

In the present embodiment, the 1,2-, 1,3-, and 3,4-bond contents and the styrene content in the block copolymer prior to hydrogenation are measured using an infrared spectrophotometer (manufactured by JASCO Corporation, FT/IR-230); and the vinyl bond content in the block copolymer is determined using the Hampton method.

In the present embodiment, the number average molecular weight can be determined as follows: gel permeation chromatography (GPC) measurement is performed, and the molecular weight of the peak in the chromatogram is determined using a calibration curve obtained by measuring commercially available standard polystyrenes (the calibration curve is prepared using the peak molecular weight of the standard polystyrenes) using tetrahydrofuran as the solvent.

The component (B) preferably has functional groups. Specifically, the component (B) can be functionalized by reacting it with a functional group-containing compound. The site to which the functional group is introduced, the number of the functional groups, and the like are not particularly limited; however, it is preferred that end(s) of the polymer chain be modified, from the viewpoint of the physical properties of the crosslinked foam. Examples of functional groups may include a hydroxyl group, a carbonyl group, a thiocarbonyl group, an acid halide group, an acid anhydride group, a carboxyl group, a thiocarboxylic acid group, an aldehyde group, a thioaldehyde group, a carboxylate group, an amide group, a sulfonic acid group, a sulfonate group, a phosphoric acid group, a phosphate group, an amino group, an imino group, a cyano group, a pyridyl group, a quinoline group, an epoxy group, a thioepoxy group, a sulfide group, an isocyanate group, an isothiocyanate group, a halogenated silicon group, a silanol group, an alkoxysilane group, a halogenated tin group, an alkoxy tin group, and a phenyltin group. Among these, preferred is at least one functional group selected from the group consisting of a hydroxyl group, a carbonyl group, an acid anhydride group, a carboxyl group, an epoxy group, an amino group, and a silanol group, from the viewpoint of the physical property balance of the crosslinked foam.

The method for producing a functionalized block copolymer is not particularly limited, and any known method can be used; examples thereof may include a method in which the unfunctionalized block copolymer is melted by heating (at 100 to 300° C.) and reacted with a functional group-containing compound; a method in which solution polymerization is performed using an organic solvent; and a method in which the unfunctionalized block copolymer in slurry form is reacted with a functional group-containing compound at 0 to 150° C.

Examples of methods for epoxidation may include, but are not limited to, the method described in Japanese Patent Laid-Open No. 6-220124, whereby the block copolymer can be epoxidized by reacting it with an epoxidizing agent such as a peracid or hydroperoxide.

Examples of peracids may include, but are not particularly limited to, performic acid, peracetic acid, perbenzoic acid, and trifluoroperacetic acid. Among these, peracetic acid is preferred because it is mass-produced on an industrial scale and, hence, is available at low cost, and is also highly stable.

Examples of hydroperoxides may include, but are not particularly limited to, hydrogen peroxide, tert-butylhydroperoxide, and cumeneperoxide.

In the epoxidation reaction, a catalyst may be used as required. For example, when a peracid is used, an alkali such as sodium carbonate or an acid such as sulfuric acid can be used as a catalyst. When a hydroperoxide is used, catalytic effects can be obtained by using a mixture of tungstic acid and caustic soda together with hydrogen peroxide, or by using an organic acid together with hydrogen peroxide, or by using molybdenum hexacarbonyl together with tert-butylhydroperoxide.

The epoxidation reaction can be performed by adjusting the reaction conditions, such as with or without solvent and the reaction temperature, according to the reactor used, the physical properties of the raw materials, and the like. For example, the reaction temperature can be selected according to the reactivity of the epoxidizing agent used. When peracetic acid, which is a preferred epoxidizing agent, is used, the reaction temperature is preferably from 0 to 70° C. When the reaction temperature is within this range, the reaction rate can be increased while inhibiting the decomposition reaction of the peracetic acid.

Examples of methods for functionalization with an acid anhydride group may include, but are not particularly limited to, the method described in Japanese Patent Laid-Open No. 62-79211, whereby the block copolymer can be graft-modified with an α,β-unsaturated carboxylic acid or its derivative, for example, its anhydride, ester, amide, imide or the like. Specific examples of α,β-unsaturated carboxylic acids or their derivatives may include maleic anhydride, maleic anhydride imide, acrylic acid or its esters, methacrylic acid or its esters, and endo-cis-bicyclo[2.2.1]-5-heptene-2,3-dicarboxylic acid or its anhydride. The amount of the α,β-unsaturated carboxylic acid or its derivative to be added is not particularly limited, but is typically from 0.01 to 20 mass parts, and preferably from 0.1 to 10 mass parts, based on 100 mass parts of the hydrogenated polymer. The reaction temperature in the graft modification is not particularly limited, but is preferably from 100 to 300° C., and more preferably from 120 to 280° C.

In the present embodiment, the mass ratio of the component (A) to the component (B), (A/B), is from 97/3 to 50/50, and is preferably from 96/4 to 60/40, and more preferably from 95/5 to 70/30. The use of the components (A) and (B) in this ratio results in a crosslinked foam having an excellent balance of physical properties in terms of hardness, crosslinking reactivity, foaming stability, lightness, impact resilience, permanent compression set, and tear strength.

The component (B) preferably has a tan δ peak temperature within a low-temperature region, as determined by dynamic viscoelasticity measurement (measurement frequency: 1 Hz), and more preferably has a tan δ peak temperature within the range of −80° C. or more and −30° C. or less. This further improves the impact resilience of the resulting crosslinked foam. An example of a method for adjusting the dynamic viscoelasticity within a low-temperature region is to provide a polymer structure containing a block segment of the aromatic monomer unit (I) and a block segment of the conjugated diene monomer unit (II). For example, when the component (B) is composed of a block segment containing 90% or more of a styrene block and a butadiene block, rather than being composed of a random copolymer block containing styrene and butadiene, the tan δ peak temperature (measurement frequency: 1 Hz) can be adjusted to the low-temperature region of −70° C. or more and −40° C. or less, thereby further improving the impact resilience of the crosslinked foam.

<(C) Organic Peroxide>

In the present embodiment, the component (C) is used as a crosslinking agent. The (C) organic peroxide is not particularly limited, and any known organic peroxide can be used. Specific examples of organic peroxides may include dicumyl peroxide, di-t-butylperoxide, 2,5-dimethyl-2,5-di-(t-butylperoxy)hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxy benzoate, t-butyl perbenzoate, t-butyl peroxyisopropyl carbonate, diacetyl peroxide, lauroyl peroxide, and t-butyl cumyl peroxide. These organic peroxides can be used singly or as a mixture of two or more. Among the above, dicumyl peroxide, di-t-butylperoxide, and 2,5-dimethyl-2,5-di-(t-butylperoxy)hexane are preferred from the viewpoint of reactivity.

The amount of the component (C) is not particularly limited, but is preferably from 0.01 to 10 mass parts, more preferably from 0.05 to 7 mass parts, and still more preferably from 1.0 to 5 mass parts, based on 100 mass parts of the total amount of the components (A) and (B). Within this range, the resulting crosslinked foam can exhibit a further improved balance of various physical properties, such as specific gravity, mechanical strength, and tear strength.

<(D) Foaming Agent>

The component (D) is not particularly limited, and any known foaming agent can be used. Specific examples of foaming agents may include organic thermally decomposable foaming agents such as azodicarbonamide (ADCA), N,N'-dinitrosopentamethylenetetramine, 4,4'-oxybis(benzenesulfonyl hydrazide), diphenylsulfone-3,3'-disulfonyl hydrazide, p-toluenesulfonyl semicarbazide, and trihydrazinotriazine; and inorganic thermally decomposable foaming agents such as sodium hydrogencarbonate, sodium carbonate, ammonium hydrogencarbonate, and ammonium carbonate. Among these, azodicarbonamide (ADCA) and sodium hydrogencarbonate are preferred from the viewpoint of their cost and reactivity.

The amount of the component (D) is not particularly limited, but is preferably from 1 to 30 mass parts based on 100 mass parts of the total amount of the components (A) and (B). The amount of the component (D) is more preferably from 3 to 20 mass parts, and still more preferably from 5 to 15 mass parts based on 100 mass parts of the total amount of the components (A) and (B). When the proportion of the component (D) is as defined above, a crosslinked foam with a high expansion ratio and a high degree of closed cells can be obtained.

The crosslinkable and foamable composition of the present embodiment may contain, as required, an organic metal compound containing a metal selected from the metals in the groups 2 to 12 of the periodic table. Specifically, zinc diacrylate (ZDA) and zinc dimethacrylate (ZDMA) are preferred. The addition of these organic metal compounds increases the gel content in the resulting crosslinked foam, allowing foam cells to be finer and more uniform.

<(E) Crosslinking Coagent>

The crosslinkable and foamable composition of the present embodiment preferably contain the component (E), as required. The use of the component (E) can further accelerate the rates of crosslinking reactions, and, therefore, is preferred from the viewpoint of productivity. The component (E) is not particularly limited, and any known crosslinking coagent can be used. Examples of crosslinking coagents may include peroxy crosslinking coagents such as sulfur, p-quinonedioxime, p,p'-dibenzoyl quinonedioxime, N-methyl-N4-dinitrosoaniline, nitrosobenzene, diphenylguanidine, and trimethylolpropane-N,N'-m-phenylenedimaleimide; divinylbenzene, triallyl cyanurate (TAC), and triallyl isocyanurate (TAIC); polyfunctional methacrylate monomers such as ethylene glycol dimethacrylate, diethylene glycol dimethacrylate, polyethylene glycol dimethacrylate, trimethylol propane trimethacrylate, and allyl methacrylate; and polyfunctional vinyl monomers such as vinylbutyrate and vinyl stearate. Among the above, triallyl cyanurate (TAC) and triallyl isocyanurate (TAlC) are preferred from the viewpoint of their addition efficiency and cost.

In the present embodiment, the amount of the component (E) is not particularly limited, but the mass ratio of the component (E) to the amount of the component (C) added ((E)/(C)) is preferably from 1/30 to 5/1, more preferably from 1/20 to 3/1, and still more preferably from 1/15 to 2/1. When the components (C) and (E) are used in the above-defined ratio, the balance between crosslinking and foaming can be appropriately controlled, thereby giving a crosslinked foam having a further improved balance of physical properties in terms of lightness, mechanical strength, impact resilience, and permanent compression set.

The crosslinkable and foamable composition of the present embodiment can contain, as required, various additives such as fillers, thermal stabilizers, weathering stabilizers, flame retardants, hydrochloric acid absorbents, and pigments, within a range that does not impair the purpose of the present embodiment.

The types of the additives are not particularly limited, and any known additives can be used.

Examples of fillers may include clay, titanium oxide, silicon oxide, zinc oxide, talc, and calcium carbonate.

Examples of thermal stabilizers may include phosphorus-based thermal stabilizers such as Irgafos 168, lactone-based thermal stabilizers such as HP-136, and sulfur-based thermal stabilizers.

Examples of weathering stabilizers may include hindered phenol-based weathering stabilizers, phosphite-based weathering stabilizers, and thioether-based weathering stabilizers.

Examples of flame retardants may include red phosphorus-based flame retardants, halogen-based flame retardants, organophosphate-based flame retardants, and inorganic flame retardants.

Examples of hydrochloric acid absorbents may include calcium stearate.

Examples of pigments may include azo-based pigments, phthalocyanine-based pigments, oxide-based pigments such as titanium oxide, chromate- and molybdate-based pigments, and inorganic pigments such as selenium sulfide compounds, ferrocyanide compounds and carbon black.

(Preparation of Crosslinkable and Foamable Composition)

The crosslinkable and foamable composition of the present embodiment can be prepared by melt-mixing specific proportions of (A) an ethylene-based copolymer, (B) a vinyl aromatic-based copolymer, (C) an organic peroxide, and (D) a foaming agent in a kneader at a temperature at which the components (C) and (D) do not decompose.

The method for melt-mixing is not particularly limited, and any known method can be used. Melt-mixing can be performed using, for example, an extruder such as a single-screw extruder, twin-screw extruder and multi-screw extruder, a Henschel mixer, a Banbury mixer, a roll mill, or a kneader. Other usable methods may include a method in which the individual components are mixed by dissolving or dispersing them, and the solvent is subsequently removed. In the present embodiment, melt-mixing is preferably performed using an extruder, from the viewpoint of productivity and kneading performance. The method of mixing is not particularly limited; for example, the components other than the components (C) and (D) may be premixed, and the components (C) and (D) may be subsequently added and mixed with the other components.

The shape of the crosslinkable and foamable composition of the present embodiment is not particularly limited; the composition may be molded into any desired shape. Examples of shapes of the composition may include pellets, sheets (sometimes also referred to as films), strands, and chips. For example, the individual components can be mixed in a pelletizer or the like to form pellets, as required.

The method for molding the crosslinkable and foamable composition of the present embodiment into a sheet is not particularly limited, and any known method can be used. Examples of methods may include a method in which the pellets of the crosslinkable and foamable composition of the present embodiment are prepared using an extruder or calender machine; a method in which the individual components of the crosslinkable and foamable composition of the present embodiment are kneaded in a Brabender mixer or the like, and then molded into a sheet using calender rolls; a method in which the crosslinkable and foamable composition of the present embodiment is formed into a sheet using a press molding machine; and a method in which the individual components are kneaded using an extruder, and the mixture is subsequently extruded through a T-die or ring die to be molded into a sheet. In this manner, an uncrosslinked and unfoamed, foamable sheet can be prepared.

(Preparation of Crosslinked Foam)

A crosslinked foam can be produced by crosslinking and foaming the crosslinkable and foamable composition of the present embodiment. In the crosslinked foam of the present embodiment, defoaming or nonuniform crosslinking in the crosslinking reactions can be effectively inhibited. Moreover, the crosslinked foam of the present embodiment can be foamed at a high expansion ratio, which has heretofore been difficult to achieve. This results in a crosslinked foam having an excellent balance of various physical properties, at least in terms of lightness, flexibility, permanent compression set, tear strength, impact resilience, and molding stability.

Furthermore, in the present embodiment, the amount of the vinyl aromatic monomer unit (I) in the component (B)

and the like are controlled, thereby further improving particular physical properties such as specific gravity, hardness, and impact resilience, while maintaining a good balance of the above-described various physical properties.

For example, when, in the above-described crosslinkable and foamable composition, the component (B) contains 5 mass % or more and less than 45 mass % of the vinyl aromatic monomer unit (I), and contains 5 to 50 mass % of the conjugated diene monomer unit, a crosslinked foam obtainable from this crosslinkable and foamable composition can have a preferred specific gravity within the range of 0.1 or more and 0.50 or less. Moreover, the crosslinked foam can have a preferred hardness (Shore C) within the range of 30 or more and 70 or less. Furthermore, the crosslinked foam can have a preferred impact resilience within the range of 30% or more and 80% or less.

For example, when, in the above-described crosslinkable and foamable composition, the component (B) contains 45 mass % or more and 80 mass % or less of the vinyl aromatic monomer unit (I), and 45 mass % or more of the component (B) is a polymer block mainly containing the vinyl aromatic monomer unit (I), a crosslinked foam obtainable from this crosslinkable and foamable composition can have a preferred specific gravity within the range of 0.05 or more and 0.15 or less. Moreover, the crosslinked foam can have a preferred hardness (Shore C) within the range of 30 or more and 70 or less. Furthermore, the crosslinked foam can have a preferred impact resilience within the range of 30% or more and 80% or less.

Generally, increasing the expansion ratio (i.e., reducing the specific gravity) tends to cause the mechanical properties and the like to deteriorate; however, the crosslinked foam obtainable in the present embodiment can maintain good mechanical properties even when it exhibits a significantly low specific gravity as described above.

The method for crosslinking is not particularly limited, and any known method can be used. For example, in addition to a chemical crosslinking method using an organic peroxide, a crosslinking method by energy beam radiation, such as an electron beam or radiation, may be combined with the chemical crosslinking. However, form the viewpoint of convenience and productivity, chemical crosslinking using an organic peroxide is preferred.

The crosslinkable and foamable composition of the present embodiment can be crosslinked and foamed by press molding or injection molding. For example, the crosslinked foam of the present embodiment may be crosslinked and foamed by injection molding into a desired shape, using the crosslinkable and foamable composition in pelletized form.

The following is an example of the case of foaming the foamable sheet obtainable by molding the crosslinkable and foamable composition of the present embodiment into a sheet. The foamable sheet is cut into dimensions from 1.0 to 1.2 times greater than the dimensions of the mold volume, and then inserted into the mold being maintained at from 120 to 200° C. With a mold clamping pressure of from 30 to 300 kgf/cm$^2$, and a mold hold time of from 10 to 90 minutes, the foamable sheet is pressurized and melted, causing the crosslinking reactions and the decomposition of the foaming agent; subsequently, the mold is opened to cause foaming of the composition, thereby preparing a primary crosslinked foam.

The shape of the mold for crosslinking and foaming in the preparation of the primary crosslinked foam is not particularly limited; for example, a mold that is configured to give a sheet can be used. The mold for crosslinking and foaming preferably has a completely hermetical structure so as to prevent leakage of the gases emitted during melting of the resin or decomposition of the foaming agent. The mold frame is preferably a mold frame having a taper on its inner surface, from the viewpoint of the mold releasability of the resin.

In the present embodiment, the primary crosslinked foam may, as required, be provided with a desired shape by compression molding. The compression molding conditions are not particularly limited; however, from the viewpoint of the reaction rates of the crosslinking agent and foaming agent, it is preferred that the mold temperature be within the range of from 120 to 200° C., the mold clamping pressure be within the range of from 30 to 300 kgf/cm$^2$, the compression time be within the range of from 5 to 60 minutes, and the compression ratio be within the range of from 1.1 to 3.0.

In the present embodiment, foamed materials can be produced by molding the crosslinkable and foamable resin composition into various shapes or dimensions other than a sheet. In the present embodiment, the shape or dimensions of the produced foam, as well as the crosslinkable and foamable resin composition that forms the foam, are not particularly limited, and the foam or composition can be molded into various shapes other than a sheet.

The crosslinked foam of the present embodiment can be utilized as sheets (sometimes also referred to as films), injection-molded articles, blow-molded articles, pressure-molded articles, vacuum-molded articles, and extrusion-molded articles of various shapes, and the like. In particular, the crosslinked foam of the present embodiment, which serves as a material that is lightweight and flexible, and has excellent permanent compression set, tear strength, and impact resilience, as well as excellent molding stability and processability, can find a wide range of applications such as automobile-related materials, construction-related materials, various packaging materials, and daily necessities. Among these applications, the crosslinked foam can be suitably used as a midsole that is inserted between a sole and an insole for imparting various functions to a shoe.

EXAMPLES

The present embodiment will be described in detail below, referring to examples; however, the present embodiment is not limited to these examples. In examples and comparative examples, crosslinked foams were prepared according to the methods described below, and their physical properties were evaluated. The physical properties of each crosslinked foam were measured as follows.
(1) Foam Stability Changes in shape immediately after and 10 minutes after the prepanration of each primary crosslinked foam were visually evaluated as follows:

Primary crosslinked foams that showed no change in their foam shape were evaluated as "A."

Primary crosslinked foams that showed slight contraction or expansion in their foam shape were evaluated as "B".

Primary crosslinked foams that showed significant deformation in their foam shape were evaluated as "C".
(2) Specific Gravity Each second-order crosslinked foam was punched to form a test piece in the form of a disc having a diameter of 1.4 cm and a thickness of 1 cm, and its specific gravity was measured using an electronic gravimeter (MD-200S, manufactured by Alfa Mirage Co., Ltd.).
(3) Hardness The hardness (Shore C) of each second-order crosslinked foam was measured using an Asker C durometer (CL-150

Shore C, manufactured by Kobunshi Keiki, Co., Ltd.), and three-second values were read. An average value of five points (arithmetic average) was then taken as the hardness.

(4) Permanent Compression Set

Each second-order crosslinked foam was punched to form a test piece in the form of a disc having a diameter of 2.6 cm; the test piece was compressed to 50% of its thickness, and maintained at 50° C. for 6 hours; the pressure was subsequently released, and the thickness after 1 hour was measured to evaluate the magnitude of the residual strain.

(5) Tear Strength

Each second-order crosslinked foam was made into a 2 cm×10 cm×1 cm (thickness) test piece, and the test piece was provided with a 2 cm cut in the center; the test piece was then placed between chucks with a distance of about 4 cm, and measurement was conducted at 100 mm/min, using a universal tensile and compression testing machine (TG-5kN, manufactured by NMB Minebea).

(6) Impact Resilience

The impact resilience of each second-order crosslinked foam was measured in accordance with JIS $K_{6255}$: a 15 g iron ball was dropped from a height of 40 cm (=L0), and the rebound height of the iron ball (=L) was measured at 23° C.; the impact resilience was determined using the following equation:

Impact resilience(%)=$L/L0$×100

The (A) ethylene-based copolymer, (B) vinyl aromatic-based copolymers, (C) organic peroxide, (D) foaming agent, and (E) crosslinking coagent used in the examples and comparative examples were as follows.

<(A) Ethylene-Based Copolymer>

An ethylene-1-butene copolymer (manufactured by Mitsui Chemicals, Inc., trade name "TAFMER DF910")

<(B) Vinyl Aromatic-Based Copolymers>

(B1) A Partially Hydrogenated Styrene-Butadiene-Styrene Triblock Copolymer

Styrene content: 20 mass %; polystyrene block content: 20 mass %; non-hydrogenated 1,3-butadiene residual content: 20 mass %; 1,2-vinyl bond content in the conjugated diene monomer unit of SBS prior to hydrogenation: 20%; weight average molecular weight Mw=60,000; molecular weight distribution Mw/Mn=1.05

(B2) A Partially Hydrogenated Styrene-Butadiene-Styrene Triblock Copolymer

Styrene content: 20 mass %; polystyrene block content: 20 mass %; non-hydrogenated 1,3-butadiene residual content: 20 mass %; 1,2-vinyl bond content in the conjugated diene monomer unit of SBS prior to hydrogenation: 40%; weight average molecular weight Mw=60,000; molecular weight distribution Mw/Mn=1.05

(B3) A Styrene-Butadiene-Styrene Triblock Copolymer

Styrene content: 20 mass %; polystyrene block content: 20 mass %; non-hydrogenated 1,3-butadiene residual content: 80 mass %; 1,2-vinyl bond content in the conjugated diene monomer unit: 20%; weight average molecular weight Mw=60,000; molecular weight distribution Mw/Mn=1.05

(B4) A Fully Hydrogenated Styrene-Butadiene-Styrene Triblock Copolymer

Styrene content: 20 mass %; polystyrene block content: 20 mass %; non-hydrogenated 1,3-butadiene residual content: 0 mass %; 1,2-vinyl bond content in the conjugated diene monomer unit of SBS prior to hydrogenation: 20%; weight average molecular weight Mw=60,000; molecular weight distribution Mw/Mn=1.05

(B5) A Partially Hydrogenated DMI (1,3-Dimethyl-2-Imidazolidinone)-Modified Styrene-Butadiene-Styrene Triblock Copolymer Styrene content: 20 mass %; polystyrene block content: 20 mass %; non-hydrogenated 1,3-butadiene residual content: 20 mass %; 1,2-vinyl bond content in the conjugated diene monomer unit of SBS prior to hydrogenation: 20%; weight average molecular weight Mw=60,000; molecular weight distribution Mw/Mn=1.05; modification ratio: 85%

(B6) A Partially Hydrogenated Styrene-Butadiene-Styrene Triblock Copolymer

Styrene content: 65 mass %; polystyrene block content: 65 mass %; non-hydrogenated 1,3-butadiene residual content: 10 mass %; 1,2-vinyl bond content in the conjugated diene monomer unit of SBS prior to hydrogenation: 35%; weight average molecular weight Mw=50,000; molecular weight distribution Mw/Mn=1.05

(B7) A Partially Hydrogenated Styrene-Butadiene-Styrene Triblock Copolymer

Styrene content: 65 mass %; polystyrene block content: 65 mass %; non-hydrogenated 1,3-butadiene residual content: 20 mass %; 1,2-vinyl bond content in the conjugated diene monomer unit of SBS prior to hydrogenation: 35%; weight average molecular weight Mw=50,000; molecular weight distribution Mw/Mn=1.05

(B8) A Fully Hydrogenated Styrene-Butadiene-Styrene Triblock Copolymer

Styrene content: 65 mass %; polystyrene block content: 65 mass %; non-hydrogenated 1,3-butadiene residual content: 0 mass %; 1,2-vinyl bond content in the conjugated diene monomer unit of SBS prior to hydrogenation: 35%; weight average molecular weight Mw=50,000; molecular weight distribution Mw/Mn=1.05

(B9) A Partially Hydrogenated DMI-Modified Styrene-Butadiene-Styrene Triblock Copolymer Styrene content: 65 mass %; polystyrene block content: 65 mass %; non-hydrogenated 1,3-butadiene residual content: 20 mass %; 1,2-vinyl bond content in the conjugated diene monomer unit of SBS prior to hydrogenation: 35%; weight average molecular weight Mw=50,000; molecular weight distribution Mw/Mn=1.05; modification ratio: 85%

The polystyrene block contents in the hydrogenated block copolymers shown above were measured using the non-hydrogenated block copolymers, according to the osmium tetroxide oxidative decomposition method described in I. M. Kolthoff, et al., *J. Polym. Sci.* 1,429 (1946). The copolymers were degraded using 0.1 g osmic acid/125 mL tertiary butanol solution.

The 1,2-vinyl bond contents were measured using the non-hydrogenated block copolymers, using an infrared spectrophotometer (manufactured by JASCO Corporation, FT/IR-230). The vinyl bond contents in the block copolymers were determined using the Hampton method.

The weight average molecular weights (Mw) and number average molecular weights (Mn) were each determined as follows: gel permeation chromatography (GPC) measurement was performed, and the molecular weight of the peak in the chromatogram was determined using a calibration curve obtained by measuring commercially available standard polystyrenes (the calibration curve was prepared using the peak molecular weight of the standard polystyrenes) using tetrahydrofuran as the solvent. The molecular weight distributions (Mw/Mn) were determined based on the weight average molecular weights (Mw) and number average molecular weights (Mn). In the present embodiment, the 1,2-, 1,3-, and 3,4-bond contents and the styrene contents in the block copolymers prior to hydrogenation were measured using an infrared spectrophotometer (manufactured by JASCO Corporation, FT/IR-230); and the vinyl bond contents in the block copolymers were determined using the Hampton method. The non-hydrogenated 1,3-butadiene residual contents were determined by measuring the 1,3-butadiene contents in the samples prior to and after hydrogenation, using an infrared spectrophotometer.

(C) Organic Peroxide

Dicumyl peroxide (manufactured by NOF Corporation) was used.

(D) Foaming Agent

Azodicarbonamide (manufactured by Eiwa Chemical Ind., Co., Ltd.) was used.

(E) Crosslinking Coagent

Triallyl cyanurate (manufactured by Akzo Nobel N.V.) was used.

Example 1

80 mass parts of the (A) ethylene-based copolymer, 20 mass parts of the (B1) vinyl aromatic-based copolymer, 0.8 mass part of the (C) organic peroxide, 13 mass parts of the (D) foaming agent, and 0.4 mass part of the (E) crosslinking coagent were melt-kneaded in a roll mill at 120° C., and the mixture was subsequently crosslinked and foamed using a press mold at 160° C. and 100 kgf/cm², thereby producing a primary crosslinked foam.

This primary crosslinked foam was compression-molded to give a specific gravity of 0.3, thereby producing a second-order crosslinked foam. The physical properties of the second-order crosslinked foam were subsequently measured according to the methods described above.

Example 2

A second-order crosslinked foam was prepared as in Example 1, except that 60 mass parts of the ethylene-based copolymer (A), 40 mass parts of the vinyl aromatic-based copolymer (B1), 0.8 mass part of the (C) organic peroxide, 13 mass parts of the (D) foaming agent, and 0.4 mass part of the (E) crosslinking coagent were used; and the physical properties of the foam were measured.

Example 3

A second-order crosslinked foam was prepared as in Example 1, except that the vinyl aromatic-based copolymer (B1) was replaced with the vinyl aromatic-based copolymer (B2), and the physical properties of the foam were measured.

Example 4

A second-order crosslinked foam was prepared as in Example 1, except that the vinyl aromatic-based copolymer (B1) was replaced with the vinyl aromatic-based copolymer (B5), and the physical properties of the foam were measured.

Example 5

90 mass parts of the ethylene-based copolymer (A), 10 mass parts of the vinyl aromatic-based copolymer (B6), 0.8 mass parts of the (C) organic peroxide, 13 mass parts of the (D) foaming agent, and 0.4 mass part of the (E) crosslinking coagent were melt-kneaded in a roll mill at 120° C., and the mixture was subsequently crosslinked and foamed using a press mold at 160° C. and 100 kgf/cm², thereby producing a primary crosslinked foam.

This primary crosslinked foam was compression-molded to give a specific gravity of 0.1, thereby producing a second-order crosslinked foam. The physical properties of the second-order crosslinked foam were subsequently measured according to the methods described above.

Example 6

A second-order crosslinked foam was prepared as in Example 5, except that the vinyl aromatic-based copolymer (B6) was replaced with the vinyl aromatic-based copolymer (B7), and the physical properties of the foam were measured.

Example 7

A second-order crosslinked foam was prepared as in Example 5, except that the vinyl aromatic-based copolymer (B6) was replaced with the vinyl aromatic-based copolymer (B9), and the physical properties of the foam were measured.

Comparative Example 1

A second-order crosslinked foam was prepared as in Example 1, except that a vinyl aromatic-based copolymer was not used, and the physical properties of the foam were measured.

Comparative Example 2

A second-order crosslinked foam was prepared as in Example 1, except that the vinyl aromatic-based copolymer (B1) was replaced with the vinyl aromatic copolymer (B3), and the physical properties of the foam were measured.

Comparative Example 3

A second-order crosslinked foam was prepared as in Example 1, except that the vinyl aromatic-based copolymer (B1) was replaced with the vinyl aromatic-based copolymer (B4), and the physical properties of the foam were measured.

Comparative Example 4

A second-order crosslinked foam was prepared as in Example 1, except that 40 mass parts of the ethylene-based copolymer (A), 60 mass parts of the vinyl aromatic-based copolymer (B1), 0.8 mass part of the (C) organic peroxide, 13 mass parts of the (D) foaming agent, and 0.4 mass part of the (E) crosslinking coagent were used; and the physical properties of the foam were measured.

Comparative Example 5

A second-order crosslinked foam was prepared as in Example 5, except that the vinyl aromatic-based copolymer (B6) was not used, and the physical properties of the foam were measured.

Comparative Example 6

A second-order crosslinked foam was prepared as in Example 5, except that the vinyl aromatic-based copolymer (B6) was replaced with the vinyl aromatic-based copolymer (B8), and the physical properties of the foam were measured.

Table 1 shows the results obtained in Examples 1 to 4 and Comparative Examples 1 to 4; and Table 2 shows the results obtained in Examples 5 to 7 and Comparative Examples 5 and 6.

a tear strength of 1.4 to 1.8 kgf/cm$^2$, and a rebound resilience of 65 to 66%. On the other hand, all of the crosslinked foams of Comparative Examples 5 and 6 had foam stability of "B" or "C", a permanent compression set of 32 to 34%, a tear strength of 1.2 to 1.4 kgf/cm$^2$, and a rebound resilience of 53 to 56%, i.e., the results were inferior to those obtained in the examples.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Ethylene-based copolymer (A) | 80 | 60 | 80 | 80 | 80 | 80 | 80 | 40 |
| Vinyl aromatic-based copolymer (B1) | 20 | 40 |  |  |  |  |  |  |
| Vinyl aromatic-based copolymer (B2) |  |  | 20 |  |  |  |  | 60 |
| Vinyl aromatic-based copolymer (B3) |  |  |  |  |  | 20 |  |  |
| Vinyl aromatic-based copolymer (B4) |  |  |  |  |  |  | 20 |  |
| Vinyl aromatic-based copolymer (B5) |  |  |  | 20 |  |  |  |  |
| Organic peroxide (C) | 0.8 | 0.8 | 0.8 | 0.8 | 0.8 | 0.8 | 0.8 | 0.8 |
| Foaming agent (D) | 13 | 13 | 13 | 13 | 13 | 13 | 13 | 13 |
| Crosslinking coagent (E) | 0.4 | 0.4 | 0.4 | 0.4 | 0.4 | 0.4 | 0.4 | 0.4 |
| Foam Stability | A | A | A | A | B | C | C | C |
| Specific gravity | 0.3 | 0.3 | 0.3 | 0.3 | 0.3 | 0.3 | 0.3 | 0.3 |
| Hardness (shore C) | 46 | 44 | 46 | 45 | 50 | 46 | 46 | 43 |
| Permanent compression set (%) | 25 | 25 | 26 | 25 | 30 | 27 | 28 | 26 |
| Tear strength (kgf/cm$^2$) | 3.3 | 3.2 | 3.2 | 3.5 | 2.7 | 2.8 | 2.8 | 2.8 |
| Rebound resilience (%) | 66 | 68 | 64 | 67 | 60 | 63 | 62 | 63 |

B1 SBS (10 mass % - 80 mass % - 10 mass %) type residual Bd20 mass %, 1,2-vin 20%
B2 SBS (10 mass % - 80 mass % - 10 mass %) type residual Bd20 mass %, 1,2-vin 40%
B3 SBS (10 mass % - 80 mass % - 10 mass %) type residual Bd80 mass %, 1,2-vin 20%
B4 SBS (10 mass % - 80 mass % - 10 mass %) type residual Bd 0 mass %, 1,2-vin 20%
B5 DMI-MODIFIED SBS (10 mass % - 80 mass % - 10 mass %) type residual Bd20 mass %, 1,2-vin 20%

TABLE 2

|  | Example 5 | Example 6 | Example 7 | Comparative Example 5 | Comparative Example 6 |
|---|---|---|---|---|---|
| Ethylene-based copolymer (A) | 90 | 90 | 90 | 90 | 90 |
| Vinyl aromatic-based copolymer (B6) | 10 |  |  |  |  |
| Vinyl aromatic-based copolymer (B7) |  | 10 |  |  |  |
| Vinyl aromatic-based copolymer (B8) |  |  |  |  | 10 |
| Vinyl aromatic-based copolymer (B9) |  |  | 10 |  |  |
| Organic peroxide (C) | 0.8 | 0.8 | 0.8 | 0.8 | 0.8 |
| Foaming agent (D) | 13 | 13 | 13 | 13 | 13 |
| Crosslinking coagent (E) | 0.4 | 0.4 | 0.4 | 0.4 | 0.4 |
| Foam Stability | A | A | A | C | B |
| Specific gravity | 0.1 | 0.1 | 0.1 | 0.1 | 0.1 |
| Hardness (shore C) | 55 | 54 | 55 | 49 | 53 |
| Permanent compression set (%) | 25 | 26 | 25 | 34 | 32 |
| Tear strength (kgf/cm$^2$) | 1.5 | 1.4 | 1.8 | 1.2 | 1.4 |
| Rebound resilience | 66 | 65 | 65 | 53 | 56 |

B6 SBS (32.5 mass %-35 mass %-32.5 mass %) type residual Bd10 mass %, 1,2-vin 35%
B7 SBS (32.5 mass %-35 mass %-32.5 mass %) type residual Bd20 mass %, 1,2-vin 35%
B8 SBS (32.5 mass %-35 mass %-32.5 mass %) type residual Bd 0 mass %, 1,2-vin 35%
B9 DMI-MODIFIED SBS (32.5 mass %-35 mass %-32.5 mass %) type residual Bd20 mass %, 1,2-vin 35%, modification ratio 85%

The crosslinked foams of Examples 1 to 4 and Comparative Examples 1 to 4 all had a specific gravity of 0.3. Each of the crosslinked foams of Examples 1 to 4 had foam stability of "A", a permanent compression set of 25 to 26%, a tear strength of 3.2 to 3.5 kgf/cm$^2$, and a rebound resilience of 64 to 68%. On the other hand, all of the crosslinked foams of Comparative Examples 1 to 4 had foam stability of "B" or "C", a permanent compression set of 26 to 30%, a tear strength of 2.7 to 2.8 kgf/cm$^2$, and a rebound resilience of 60 to 63%, i.e., the results were inferior to those obtained in the examples.

The crosslinked foams of Examples 5 to 7 and Comparative Examples 5 and 6 all had a specific gravity of 0.1. Each of the crosslinked foams of Examples 5 to 7 had foam stability of "A", a permanent compression set of 25 to 26%, The foregoing results confirmed that the crosslinkable and foamable composition of each of the examples can provide a crosslinked foam that has a good balance and is excellent at least in terms of molding stability, lightness, flexibility, permanent compression set, tear strength, and impact resilience.

The present application is based on the Japanese patent applications (Japanese Patent Application Nos. 2008-325652 and 2008-325655) filed with the Japan Patent Office on Dec. 22, 2008, the contents of which are incorporated herein by reference.

INDUSTRIAL APPLICABILITY

The crosslinkable and foamable composition of the present invention, and crosslinked foams obtained therefrom, can be suitably used as various molded articles such as automotive parts, civil engineering and construction applications, household appliance parts, shoe midsoles, sporting goods, sundries, and stationery, as well as in a wide range of other fields.

What is claimed is:

1. A crosslinkable and foamable composition comprising:
   (A) an ethylene-based copolymer;
   (B) a vinyl aromatic-based copolymer comprising a vinyl aromatic monomer unit and an unsaturated bond-containing conjugated diene monomer unit;
   (C) an organic peroxide; and
   (D) a foaming agent; wherein
   a mass ratio of the component (A) to the component (B), (A/B), is from 97/3 to 50/50;
   the component (B) is a styrene-based block copolymer;
   the component (B) comprises 5 mass % or more and 80 mass % or less of the vinyl aromatic monomer unit, and 10 to 30 mass % of the conjugated diene monomer unit after hydrogenation;
   a 1,2-vinyl bond content in the conjugated diene monomer unit of the component (B) prior to hydrogenation is from 5 to 50%;
   70% or more of the 1,2-vinyl bond content in the conjugated diene monomer unit of the component (B) is hydrogenated;
   the component (B) has a tan δ peak temperature within a range of −80° C. or more and −30° C. or less, as determined by dynamic viscoelasticity measurement (1 Hz).

2. A crosslinkable and foamable composition comprising:
   (A) an ethylene-based copolymer;
   (B) a vinyl aromatic-based copolymer comprising a vinyl aromatic monomer unit and an unsaturated bond-containing conjugated diene monomer unit;
   (C) an organic peroxide; and
   (D) a foaming agent; wherein
   a mass ratio of the component (A) to the component (B), (A/B), is from 97/3 to 50/50;
   the component B s a styrene-based block copolymer;
   the component (B) comprises 5 mass % or more and less than 45 mass % of the vinyl aromatic monomer unit, and 10 to 30 mass % of the conjugated diene monomer unit after hydrogenation;
   a 1,2-vinyl bond content in the conjugated diene monomer unit of the component (B) prior to hydrogenation is from 5 to 50%;
   70% or more of the 1,2-vinyl bond content in the conjugated diene monomer unit of the component (B) is hydrogenated;
   the component (B) has a tan δ peak temperature within a range of −80° C. or more and −30° C. or less, as determined by dynamic viscoelasticity measurement (1 Hz).

3. A crosslinkable and foamable composition comprising:
   (A) an ethylene-based copolymer;
   (B) a vinyl aromatic-based copolymer comprising a vinyl aromatic monomer unit and an unsaturated bond-containing conjugated diene monomer unit, and having at least a polymer block mainly containing a vinyl aromatic monomer unit;
   (C) an organic peroxide; and
   (D) a foaming agent; wherein
   a mass ratio of the component (A) to the component (B), (A/B), is from 97/3 to 50/50;
   the component (B) is a styrene-based block copolymer;
   the component (B) comprises 45 mass % or more and 80 mass % or less of the vinyl aromatic monomer unit, 45 mass % or more of the component (B) being included in the polymer block mainly containing the vinyl aromatic monomer unit, and the component (B) comprising 10 to 30 mass % of the conjugated diene monomer unit after hydrogenation;
   a 1,2-vinyl bond content in the conjugated diene monomer unit of the component (B) prior to hydrogenation is from 5 to 50%;
   70% or more of the 1,2-vinyl bond content conjugated diene monomer unit of the component (B) is hydrogenated;
   the component (B) has a tan δ peak temperature within a range of −80° C. or more and −30° C. or less, as determined by dynamic viscoelasticity measurement (1 Hz).

4. The crosslinkable and foamable composition according to claim 1, wherein the component (A) is an ethylene-α-olefin-based copolymer.

5. The crosslinkable and foamable composition according to claim 1, wherein the mass ratio of the component (A) to the component (B), (A/B), is from 95/5 to 70/30.

6. The crosslinkable and foamable composition according to claim 1, further comprising:
   (E) a crosslinking coagent.

7. The crosslinkable and foamable composition according to claim 1, wherein the component (B) s a hydrogenated styrene-based block copolymer.

8. The crosslinkable and foamable composition according to claim 1, wherein the component (B) is obtained by hydrogenating a block copolymer comprising a polymer block mainly containing styrene and a polymer block mainly containing 1,3-butadiene.

9. The crosslinkable and foamable composition according to claim 1, wherein the component (B) has a functional group.

10. A crosslinked foam obtained by crosslinking and foaming the crosslinkable and foamable composition according to claim 1.

11. A crosslinked foam obtained by crosslinking and foaming the crosslinkable and foamable composition according to claim 2;
    wherein the crosslinked foam has a specific gravity within a range of 0.1 or more and 0.50 or less, an impact resilience within a range of 30% or more and 80% or less, and a hardness (Shore C) within a range of 30 or more and 70 or less.

12. A crosslinked foam obtained by crosslinking and foaming the crosslinkable and foamable composition according to claim 3,
    wherein the crosslinked foam has a specific gravity within a range of 0.05 or more and 0.15 or less, and a hardness (Shore C) within a range of 30 or more and 70 or less.

13. A shoe midsole comprising the crosslinked foam according to claim 10.

14. The crosslinkable and foamable composition according to claim 5, wherein the mass ratio of the component (A) to the component (B), (A/B), is from 90/10 to 70/30.

15. The crosslinked foam according to claim 12, wherein the crosslinked foam has an impact resilience of 30% or more and 80% or less.

* * * * *